United States Patent [19]
Clay et al.

[11] 3,985,483
[45] Oct. 12, 1976

[54] APPARATUS FOR MAKING FOAMED PLASTIC PIPE INSULATION

[75] Inventors: Frank M. Clay; Leland G. Moran; Russell R. Lawyer, all of Newark, Ohio

[73] Assignee: Owens-Corning Fiberglas Corporation, Toledo, Ohio

[22] Filed: Jan. 31, 1975

[21] Appl. No.: 545,953

[52] U.S. Cl. ............................. 425/112; 264/40.1; 264/46.2; 264/46.9; 425/115; 425/143; 425/224; 425/817 C
[51] Int. Cl.² ........................................ B29D 27/04
[58] Field of Search ............... 118/9; 264/40, 45.8, 264/46.2, 46.3, 46.5, 46.6, 46.9; 156/64, 378; 250/341, 342; 427/8, 55, 56; 425/4 C, 817 C, 141, 140, 143, 144, 150, 371, 372, 224, 385, 391, 112, 122, 123, 129, 115, 89, 135

[56] References Cited
UNITED STATES PATENTS

| | | | |
|---|---|---|---|
| 3,118,800 | 1/1964 | Snelling | 264/46.2 X |
| 3,245,261 | 4/1966 | Buteux et al. | 250/341 X |
| 3,265,786 | 8/1966 | Voelker | 425/141 X |
| 3,374,300 | 3/1968 | Azuma | 425/4 C X |
| 3,809,512 | 5/1974 | Blackwell et al. | 425/817 C X |
| 3,816,043 | 6/1974 | Snelling et al. | 425/817 C X |
| 3,837,771 | 9/1974 | Kolakowski et al. | 425/817 C X |
| 3,842,277 | 10/1974 | Jayachandra | 250/341 X |
| 3,860,371 | 1/1975 | Willy | 425/817 C X |

Primary Examiner—Francis S. Husar
Assistant Examiner—Mark Rosenbaum
Attorney, Agent, or Firm—John W. Overman; Paul J. Rose

[57] ABSTRACT

The apparatus includes a stationary hollow mandrel supported at one end, a pair of forming shoes over which strips of material are respectively pulled longitudinally of the mandrel to provide a cylindrical inner liner surrounding the mandrel and a cylindrical outer jacket surrounding the inner liner in spaced relationship thereto, a conduit having an outlet end portion disposed within the outer jacket above the inner liner, supply means for supplying foamable hardenable liquid material to an inlet end portion of the conduit, additional supply means for separately supplying a fast acting catalyst to the foamable material in the conduit, means for reciprocating the outlet end portion of the conduit transversely over the inner liner, conveyor-mold means confining the outer jacket as the foamable material foams and cures, rotatable tire means for pulling the insulation formed by the outer jacket, the cured foam, and the inner liner off the mandrel longitudinally thereof, a traveling saw for cutting the insulation into predetermined lengths, a slitting saw for slitting the tubular insulation longitudinally, and an infrared sensor for controlling the speed of two motors respectively driving the conveyor-mold means and the rotatable tire means in accordance with the amount of heat generated by the foamable hardenable liquid material.

14 Claims, 6 Drawing Figures

FIG. 1

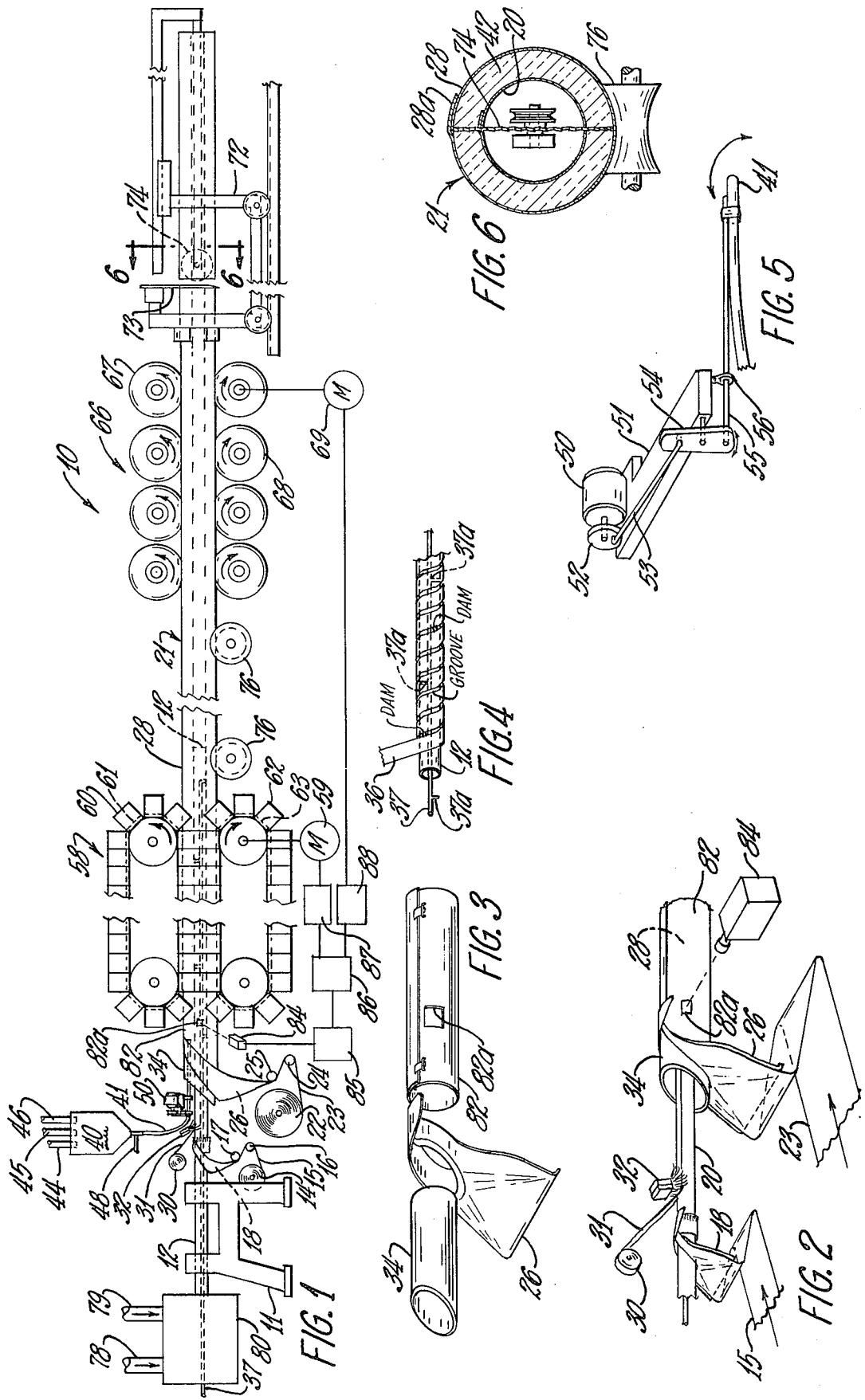

APPARATUS FOR MAKING FOAMED PLASTIC PIPE INSULATION

This invention relates to an apparatus for producing pipe insulation of formed plastic such as polyurethane foam.

An object of the invention is to provide an improved apparatus for producing foamed plastic pipe insulation.

Another object is to provide an apparatus for producing foamed plastic pipe insulation having improved means for distributing foamable material.

Yet another object is to provide an apparatus for producing foamed plastic pipe insulation having improved means for forming a cylindrical outer jacket for the pipe insulation.

Still another object is to provide an apparatus for producing foamed plastic insulation having means for controlling the speed of the progress of the insulation in accordance with the amount of heat generated by foamable hardenable liquid material at a particular location.

A further object is to provide an apparatus for producing foamed plastic insulation having means for accelerating the curing process.

A still further object is to provide an apparatus for producing foamed plastic pipe insulation having improved means for distributing air about a mandrel to aid in the movement of an inner liner for the insulation along the mandrel.

Other objects and advantages will become apparent when the following specification is considered along with the accompanying drawings in which:

FIG. 1 is a side elevational view of plastic foam pipe insulation producing apparatus constructed in accordance with the invention, with certain portions omitted and other portions shown schematically;

FIG. 2 is a perspective view of certain portions of the apparatus of FIG. 1 adjacent a forming shoe for an outer jacket of the insulation;

FIG. 3 is an exploded perspective view of certain portions of the apparatus of FIG. 1 shown in FIG. 2;

FIG. 4 is a fragmentary perspective view of certain portions of the apparatus of FIG. 1 showing a air supply system for the periphery of a mandrel along which an inner liner of the insulation is pulled;

FIG. 5 is a fragmentary perspective view of certain portions of the apparatus of FIG. 1 showing means for reciprocating an outlet end portion of a conduit for dispensing foamable material; and FIG. 6 is a enlarged cross sectional view taken generally along the line 6—6 of FIG. 1.

With reference to the drawings, an apparatus 10 constructed in accordance with the invention is shown in FIG. 1 and includes a frame structure 11 supporting a stationary hollow cylindrical mandrel 12 at a left-hand end portion as viewed in FIG. 1. A suitably supported roll 14 supplies a strip of material 15 over a pair of suitably supported rollers 16 and 17 and over a forming shoe 18 to form it into a cylindrical inner liner 20 (FIGS. 2 and 6) for pipe insulation 21 produced by the apparatus 10. A suitably supported roll 22 supplies a strip of material 23 over a pair of suitably supported rollers 24 and 25 and over a forming shoe 26 to form it into a cylindrical outer jacket 28 for the insulation 21. A suitably supported roll 30 supplies a strip of pressure sensitive tape 31 to a longitudinal joint of the inner liner 20 where opposite edge portions of the strip 15 overlap. A suitably mounted brush 32 presses the tape 31 into plae. A plug member 34 best shown in FIG. 3 is provided in a cylindrical portion of the forming show 26 to yieldingly grip the strip 23 as it passes into the cylindrical portion and thereby maintain the strip 23 smooth as it is formed into the outer jacket 28.

The portion of the mandrel 12 to the right of the forming shoe 18 as viewed in FIG. 1 is helically wrapped with thin metal stripping 36, as best shown in FIG. 4, adjacent convolutions thereof being spaced from each other to provide one or more helical grooves at the periphery of the mandrel 12. Alternatively, the grooves could be provided directly in the mandrel 12. The grooves are blocked at intervals by any suitable means to provide helical groove segments. A compressed air supply line 37 extends inside the mandrel 12 and is provided with a plurality of branches 37a each leading through a suitable hole in the mandrel 12 to one of the helical groove segments. Compressed air may thus be dispersed generally uniformly about the periphery of the mandrel 12 and the inner liner 20 of the insulation 21 may thus be more readily moved along the stationary mandrel 12.

A mixing tank 40 is provided to supply a foamable hardenable liquid material to an inlet end portion of a conduit 41 having an outlet end portion disposed within the outer jacket 28 above the inner liner 20, foamed and cured foamable material 42 being shown between the liner 20 and the jacket 28 in FIG. 6. The mixing tank 40 is shown as provided with three inlet pipes or hoses 44, 45, and 46 for supplying components of the foamable hardenable liquid material. For example, the hose 44 may supply an isocyanate, the hose 45 may supply a polyol with a relatively slowly acting catalyst such as triethylenediamine in dipropylene glycol, and the hose 46 may supply Freon 12 (dichlorodifluoromethane). After these mixed components leave the mixing tank 40, a relatively fast acting catalyst such as dimethylethanolamine is added to the foamable hardenable liquid material and slowly acting catalyst in the conduit 41 through a pipe or hose 48 connected to the conduit 41 downstream of the inlet end portion thereof communicating with the tank 40 material in the conduit 41 through a tube 48 connected thereto.

A suitably mounted motor 50 is provided for transversely reciprocating the outlet end portion of the conduit 41 above the inner liner 20. As best shown in FIG. 5, the motor 50 is mounted on a platform 51 and drives a disc 52 having a link 53 pivotally connected thereto eccentrically thereof. A lever 54 is pivotally mounted intermeidately thereof on the platform 51 and has one end portion pivotally connected to the link 53 and the other end portion loosely connected to one end of a rod 55 loosely mounted intermediately thereof in an eye 56 secured to the platform 51. The outlet end portion of the conduit 41 is secured to the other end of the rod 55.

Conveyor-mold means 58 driven by a motor 59 in any suitable manner is provided to confine the outer jacket 28 as the foamable material foams and cures and to aid in pulling of the insulation 21 along the mandrel 12. The conveyor-mold means 58 includes a plurality of upper mold sections 60 mounted on an endless chain 61 and a plurality of lower mold sections 62 mounted on an endless chain 63, each of the mold sections having a semi-cylindrical recess for shaping the insulation 21.

A pulling means 66 for the insulation 21 includes a plurality of upper tires 67 driven counter-clockwise and a plurality of lower tires 68 driven clockwise as viewed in FIG. 1 by a motor 69. A horizontally reciprocable carriage 72 is provided with a vertically and horizontally reciprocable saw 73 for cutting the insulation 21 into predetermined lengths and with a circular saw 74 for slitting the insulation longitudinally, an overlapping flap 28a of the outer jacket 28 being raised out of the way of the saw 74 during the slitting operation by means not shown. A plurality of suitable mounted rollers 76 are provided for supporting the insulation 21 as required.

A hot air duct 78 and a cold air duct 79 lead to an air chamber 80 which supplies air to the interior of the mandrel 12. Hot air is supplied initially to heat the mandrel 12 upon starting operation of the apparatus 10. Cold air is supplied later to cool the mandrel 12 after the exothermal foaming and curing action of the foamable hardenable liquid material has begun.

A suitably supported removable sheet metal pipe 82 is provided to support the outer jacket 28 between the forming shoe 26 and the conveyor-mold means 58. The pipe 82 is provided with a suitable aperture 82a through which a suitably supported infrared sensing means 84 is directed for sensing the heat liberated by the foamable hardenable liquid material.

The infrared sensing means of 84 converts invisible infrared energy emitted by the foaming material into an electrical signal and sends it to a panel display module 85 which gives direct temperature readout and closed loop control. The module 85 sends the signal to a controller 86 which constantly compares the signal from the module 85 with a reference voltage, and when they are different, changes the output signal to each of a pair of motor control units 87 and 88 which respectively control the speed of the motors 59 and 69.

If the infrared sensing means 84 senses a too high temperature at the aperture 82a, the controller 86 increases the speed of the motors 59 and 69. This will prevent too fast curing of the foamable hardenable liquid material at the location of the aperture 82a and possible plugging of the conduit 41. If the infrared sensing means 84 senses a too low temperature at the aperture 82a, the controller 86 decreases the speed of the motors 59 and 69. This will give the foamable hardenable liquid material more time to react at the location of the aperture 82a and prevent voids in the finished insulation product 21.

Various modifications may be made in the structure shown and described without departing from the spirit and scope of the invention as set forth in the appended claims.

I claim:

1. Apparatus for making foamed plastic insulation comprising means for supplying a first strip of material, means for supplying a second strip of material in spaced parallel relationship with the first strip of material, a conduit having an outlet end portion disposed between the strips of material and dispensing foamable hardenable liquid material during the making of the insulation, supply means for supplying foamable hardenable liquid material to an inlet end portion of the conduit, motor-driven pulling means for pulling insulation formed by the two strips of material and cured foam horizontally to draw the two strips of materials respectively from their supplying means, motor-driven conveyor-mold means between the outlet end portion of the conduit and the pulling means for confining one of the two strips of material during the making of the insulation as the foamable hardenable liquid material foams and cures and for aiding the pulling means in the pulling of the insulation, and infrared sensing means operatively associated during the making of the insulation with the foamable hardenable liquid material between the two strips of material and between the outlet end portion of the conduit and the conveyor-mold means for controlling the speed of a motor driving the pulling means and the speed of a motor driving the conveyor-mold means in accordance with the amount of heat generated by the foamable hardenable liquid material.

2. Apparatus for making tubular, foamed plastic pipe insulation comprising a stationary hollow mandrel supported at one end portion, means adjacent the mandrel for supplying a first strip of material, a first forming shoe operatively associated with the mandrel and over which during the making of the insulation the first strip of material is drawn to form it into a cylindrical liner for the pipe insulation, means adjacent the mandrel for supplying a second strip of material, a second forming shoe operatively associated with the mandrel and over which during the making of the insulation the second strip of material is drawn to form it into a cylindrical outer jacket for the pipe insulation, a conduit having a outlet end portion disposed within the outer jacket and dispensing foamable hardenable liquid material during the making of the insulation, supply means for supplying foamable hardenable liquid material including a relatively slowly acting catalyst to an inlet end portion of the conduit, motor-driven pulling means aligned with the mandrel for pulling insulation formed by the outer jacket, inner liner, and cured foam off an opposite end portion of the mandrel longitudinally thereof while also pulling the first strip of material over the first forming shoe and the second strip of material over the second forming shoe, motor-driven conveyor-mold means operatively associated with the mandrel between the outlet end portion of the conduit and the pulling means for confining the outer jacket during the making of the insulation as the foamable hardenable liquid material foams and cures and for aiding the pulling means in the pulling of the insulation, and infrared sensing means operatively associated during the making of the insulation with the foamable hardenable liquid material in the outer jacket between the outlet end portion of the conduit and the conveyor-mold means for controlling the speed of a motor driving the pulling means and the speed of a motor driving the conveyor-mold means in accordance with the amount of heat generated by the foamable hardenable liquid material.

3. Apparatus as claimed in claim 2 including means for reciprocating the outlet end portion of the conduit within the outer jacket transversely over the inner liner to dispense foamable hardenable liquid material substantially uniformly on opposite sides thereof.

4. Apparatus as claimed in claim 3 including additional supply means connected to the conduit downstream of the inlet end portion for the foamable hardenable liquid material and slowly acting catalyst for separately supplying a relatively fast acting catalyst to the foamable hardenable liquid material and slowly acting catalyst in the conduit.

5. Apparatus as claimed in claim 3 wherein the second strip of material is reversely drawn over the second forming shoe and including a plug member disposed in the second forming shoe for maintaining the second strip of material smooth as it is being reversely drawn and formed into the outer jacket.

6. Apparatus as claimed in claim 2 including additional supply means connected to the conduit downstream of the inlet end portion for the foamable hardenable liquid material and slowly acting catalyst for separately supplying a relatively fast acting catalyst to the foamable hardenable liquid material and slowly acting catalyst in the conduit.

7. Apparatus as claimed in claim 6 wherein the second strip of material is reversely drawn over the second forming shoe and including a plug member disposed in the second forming shoe for maintaining the second strip of material smooth as it is being reversely drawn and formed into the outer jacket.

8. Apparatus as claimed in claim 2 wherein the second strip of material is reversely drawn over the second forming shoe and including a plug member disposed in the second forming shoe for maintaining the second strip of material smooth as it is being reversely drawn and formed into the outer jacket.

9. Apparatus for making tubular, foamed plastic pipe insulation comprising a stationary hollow mandrel supported at one end portion, means adjacent the mandrel for supplying a first strip of material, a first forming shoe operatively associated with the mandrel and over which during the making of the insulation the first strip of material is reversely drawn to form it into a cylindrical inner liner for the pipe insulation, means adjacent the mandrel for supplying a second strip of material, a second forming shoe operatively associated with the mandrel and over which during the making of the insulation the second strip of material is reversely drawn to form it into a cylindrical outer jacket for the pipe insulation, a plug member disposed in the second forming shoe for maintaining the second strip of material smooth as it is being reversely drawn and formed into the outer jacket, a conduit having an outlet end portion disposed within the outer jacket above the inner liner and dispensing formable hardenable liquid material during the making of the insulation, means for reciprocating the outlet end portion of the conduit within the outer jacket transversely over the inner liner, supply means for supplying a foamable hardenable liquid material including a relatively slowing acting catalyst to an inlet end portion of the conduit, additional supply means connected to the conduit downstream of the inlet end portion for the foamable hardenable liquid material and slowly acting catalyst for separately supplying a relatively fast acting catalyst to the foamable hardenable liquid material and slowly acting catalyst in the conduit, motordriven pulling means aligned with the mandrel for pulling insulation formed by the outer jacket, inner liner, and cured foam off an opposite end portion of the mandrel longitudinally thereof while also pulling the first strip of material over the first forming shoe and the second strip of material over the second forming shoe, motor-driven conveyor-mold means operatively associated with the mandrel between the outlet end portion of the conduit and the pulling means for confining the outer jacket during the making of the insulation as the foamable hardenable liquid material foams and cures and for aiding the pulling means in the pulling of the insulation, infrared sensing means operatively associated during the making of the insulation with the foamable hardenable liquid material in the outer jacket between the outlet end portion of the conduit and the conveyor-mold means for controlling the speed of a motor driving the pulling means and the speed of a motor driving the conveyor-mold means in accordance with the amount of heat generated by the foamable hardenable liquid material, means providing a helical groove on the periphery of the mandrel, and air supply means supplying air under pressure to the helical groove during the making of the insulation to aid in the pulling of the inner liner of the insulation along the mandrel.

10. Apparatus for making tubular, foamed plastic pipe insulation comprising a stationary hollow mandrel supported at one end portion, means adjacent the mandrel for supplying a first strip of material, a first forming shoe operatively associated with the mandrel and over which during the making of the insulation the first strip of material is reversely drawn to form it into a cylindrical inner liner for the pipe insulation, means adjacent the mandrel for supplying a second strip of material, a second forming shoe operatively associated with the mandrel and over which during the making of the insulation the second strip of material is reversely drawn to form it into a cylindrical outer jacket for the pipe insulation, a plug member disposed in the second forming shoe for maintaining the second strip of material smooth as it is being reversely drawn and formed into the outer jacket, a conduit having an outlet end portion disposed within the outer jacket and dispensing foamable hardenable liquid material during the making of the insulation, supply means for supplying foamable hardenable liquid material to an inlet end portion of the conduit, motor-driven pulling means aligned with the mandrel for pulling insulation formed by the outer jacket, inner liner, and cured foam off an end portion of the mandrel longitudinally thereof while also pulling the first strip of material over the first forming shoe and the second strip of material over the second forming shoe, and motor-driven conveyor-mold means operatively associated with the mandrel between the outlet end portion of the conduit and the pulling means for confining the outer jacket during the making of the insulation as the foamable hardenable liquid material foams and cures and for aiding the pulling means in the pulling of the insulation.

11. Apparatus for making tubular, foamed plastic pipe insulation comprising a stationary hollow mandrel supported at one end portion, means adjacent the mandrel for supplying a first strip of material, a first forming shoe operatively associated with the mandrel and over which during the making of the insulation the first strip of material is drawn to form it into a cylindrical inner liner for the pipe insulation, means adjacent the mandrel for supplying a second strip of material, a second forming shoe operatively associated with the mandrel and over which during the making of the insulation the second strip of material is drawn to form it into a cylindrical outer jacket for the pipe insulation, a conduit having an outlet end portion disposed within the outer jacket and dispensing foamable hardenable liquid material during the making of the insulation, supply means for supplying foamable hardenable liquid material including a relatively slowly acting catalyst to an inlet end portion of the conduit, additional supply means connected to the conduit downstream of the inlet end porton for the foamable hardenable liquid material and slowly acting catalyst for separately supplying a relatively fast acting catalyst to the foamable hardenable liquid material and slowly acting catalyst in the conduit, motor-driven pulling means aligned with the mandrel for pulling insulation formed by the outer jacket, inner liner, and cured foam off an opposite end portion of the mandrel longitudinally thereof while also pulling the first strip of material over the first forming shoe and the second strip of material over the second forming shoe, motor-driven conveyor-mold means operatively associated with the mandrel between the outlet end portion of the conduit and the pulling means for confining the outer jacket during the making of the insulation as the foamable hardenable liquid material foams and cures and for aiding the pulling means in the pulling of the insulation, the second strip of material being reversely drawn over the second forming shoe, and a plug member disposed in the second forming shoe for maintaining the second strip of material smooth as it is being reversely drawn and formed into the outer jacket.

12. Apparatus for making tubular, foamed plastic pipe insulation comprising a stationary hollow mandrel supported at one end portion, means adjacent the mandrel for supplying a first strip of material, a first forming shoe operatively associated with the mandrel and over which during the making of the insulation the first strip of material is drawn to form it into a cylindrical inner liner for the pipe insulation, means adjacent the mandrel for supplying a second strip of material, a second forming shoe operatively associated with the mandrel and over which during the making of the insulation the second strip of material is drawn to form it into a cylindrical outer jacket for the pipe insulation, a conduit haviing an outlet end portion disposed within the outer jacket above the inner liner and dispensing foamable hardenable liquid material during the making of the insulation, means for reciprocating the outlet end portion of the conduit within the outer jacket transversely over the inner liner to dispense foamable hardenable liquid material substantially uniformly on opposite sides thereof, supply means for supplying foamable hardenable liquid material including a relatively slowly acting catalyst to an inlet end portion of the conduit, motor-driven pulling means aligned with the mandrel for pulling insulation formed by the outer jacket, inner liner, and cured foam off an opposite end portion of the mandrel longitudinally thereof while also pulling the first strip of material over the first forming shoe and the second strip of material over the second forming shoe, motor-driven conveyor-mold means operatively associated with the mandrel between the outlet end portion of the conduit and the pulling means for confining the outer jacket during the making of the insulation as the foamable hardenable liquid material foams and cures and for aiding the pulling means in the pulling of the insulation, the second strip of material being reversely drawn over the second forming shoe, and a plug member disposed in the second forming shoe for maintaining the second strip of material smooth as it is being reversely drawn and formed into the outer jacket.

13. Apparatus as claimed in claim 12 including additional supply means connected to the conduit downstream of the inlet end portion for the foamable hardenable liquid material and slowly acting catalyst for separately supplying a relatively fast acting catalyst to the foamable hardenable liquid material and slowly acting catalyst in the conduit.

14. Apparatus for making tubular, foamed plastic pipe insulation comprising a stationary hollow mandrel supported at one end portion, means adjacent the mandrel for supplying a first strip of material, a first forming shoe operatively associated with the mandrel and over which during the making of the insulation the first strip of material is drawn to form it into a cylindrical inner liner for the pipe insulation, means adjacent the mandrel for supplying a second strip of material, a second forming shoe operatively associated with the mandrel and over which during the making of the insulation the second strip of material is drawn to form it into a cylindrical outer jacket for the pipe insulation, a conduit having an outlet end portion disposed within the outer jacket and dispensing foamable hardenable liquid material during the making of the insulation, supply means for supplying foamable hardenable liquid material to an inlet end portion of the conduit, motor-driven pulling means aligned with the mandrel for pulling insulation formed by the outer jacket, inner liner, and cured foam off an opposite end portion of the mandrel longitudinally thereof while also pulling the first strip of material over the first forming shoe and the second strip of material over the second forming shoe, motor-driven conveyor-mold means operatively associated with the mandrel between the outlet end portion of the conduit and the pulling means for confining the outer jacket during the making of the insulation as the foamable hardenable liquid material foams and cures and for aiding the pulling means in the pulling of the insulation, means providing a helical groove on the periphery of the mandrel, the helical groove being blocked at intervals to provide a plurality of successive helical groove segments, and air supply means supplying air under pressure separately to the helical groove segments during the making of the insulation to aid in the pulling of the inner liner of the insulation along the mandrel.

* * * * *